US012810299B2

(12) United States Patent
Cuadrado Montano et al.

(10) Patent No.: US 12,810,299 B2
(45) Date of Patent: Nov. 24, 2026

(54) SYSTEM AND METHOD FOR DETECTING AND MITIGATING REAL-TIME FRAUD ATTACKS USING AGGREGATED CONSORTIUM DATA FOR TRANSACTIONS

(71) Applicant: Socure, Inc., Incline Village, NV (US)

(72) Inventors: Jonas Cuadrado Montano, Incline Village, NV (US); Huyen Khanh Nguyen, Incline Village, NV (US); Rishabh Pande, Incline Village, NV (US); Yarne Paul Hermann, Incline Village, NV (US); Brian Patrick Heffernan, Incline Village, NV (US); Mehmet Yigit Yildirim, Incline Village, NV (US); Pablo Ysrrael Abreu, Incline Village, NV (US)

(73) Assignee: Socure, Inc., Incline Village, NV (US)

( * ) Notice: Subject to any disclaimer, the term of this patent is extended or adjusted under 35 U.S.C. 154(b) by 0 days.

(21) Appl. No.: 18/381,381

(22) Filed: Oct. 18, 2023

(65) Prior Publication Data

US 2025/0131435 A1 Apr. 24, 2025

(51) Int. Cl.
*G06N 20/00* (2019.01)
*G06Q 20/40* (2012.01)

(52) U.S. Cl.
CPC ......... *G06Q 20/4016* (2013.01); *G06N 20/00* (2019.01); *G06Q 20/4014* (2013.01)

(58) Field of Classification Search
CPC .... G06N 20/00; G06Q 20/40; G06Q 20/4016; G06Q 20/4014
See application file for complete search history.

(56) References Cited

U.S. PATENT DOCUMENTS

| | | | | |
|---|---|---|---|---|
| 2021/0142126 | A1 | 5/2021 | Warrick, II et al. | |
| 2022/0327504 | A1 | 10/2022 | Koren et al. | |
| 2023/0031123 | A1* | 2/2023 | Giokas | G06N 20/20 |

(Continued)

FOREIGN PATENT DOCUMENTS

| | | | | |
|---|---|---|---|---|
| CN | 110555455 | A | 12/2019 | |
| EP | 3451219 | A1 * | 3/2019 | G06Q 40/08 |

OTHER PUBLICATIONS

Sharma; Machine learning model for credit card fraud detection : a comparative analysis, International arab journal of information technology, 2021, vol. 18 (6), p. 789-796.*

(Continued)

*Primary Examiner* — Ilse I Immanuel
(74) *Attorney, Agent, or Firm* — Charles B. Lobsenz; Brian H. Buck; Potomac Law Group, PLLC

(57) ABSTRACT

Provided are a system and methodology for fraud detection and prevention to minimize an ongoing effect of fraud attack. The minimization is rooted in leveraging real-time recognition for delineated, time-based frequency for patterning within transaction data in which such patterning can be indicative of fraud. Once the recognition is performed, affected entities can be notified such that they may then institute efforts to thwart effects of the fraud attack. Still further, the recognition can serve to mitigate effects of fraud attack for subsequent iterations of transaction data by automating, in real-time, disapproval of transactions infected with the aforementioned patterning.

20 Claims, 4 Drawing Sheets

(56) References Cited

U.S. PATENT DOCUMENTS

| | | | | |
|---|---|---|---|---|
| 2023/0104208 | A1* | 4/2023 | Misra | G06Q 20/405<br>705/64 |
| 2023/0154222 | A1* | 5/2023 | Desai | G06Q 20/102<br>382/100 |

OTHER PUBLICATIONS

European Search Report issued in application No. EP24206493 dated Dec. 23, 2024.

* cited by examiner

SYSTEM AND METHOD FOR DETECTING AND MITIGATING REAL-TIME FRAUD ATTACKS USING AGGREGATED CONSORTIUM DATA FOR TRANSACTIONS

FIELD OF THE DISCLOSURE

Disclosed embodiments relate to fraud identification and prevention, and more specifically, to the inspection of, and warning for, transaction data from which delineated, time-based frequency for patterning of such data can designate inundation of fraud in transactions.

BACKGROUND

Transaction data (e.g., personally identifiable information (PII) such as email, social security number), as well as manner of procuring and conveying such data, are often targets of manipulation for fraudsters hoping to successfully deceive recipients who use that data to guide their decision making. If such deceit is indeed successful, the financial and/or reputational effects on those recipients can be devastating. This is particularly the case when the deceit infiltrates transaction data which is needed to render decisions regarding credit or other financial opportunities, employment opportunities, regulatory approval(s), etc. Thus, as will be understood, reducing exposure to various magnitude of risk that can be associated with fraudulent attempts to impact orderly reliance on the aforementioned transaction data can ensure that corresponding transactions can proceed as intended.

SUMMARY OF THE INVENTION

It is to be understood that both the following summary and the detailed description are exemplary and explanatory and are intended to provide further explanation of the present embodiments as claimed. Neither the summary nor the description that follows is intended to define or limit the scope of the present embodiments to the particular features mentioned in the summary or in the description. Rather, the scope of the present embodiments is defined by the appended claims.

Embodiments may include a method for identifying fraud attack on an entity and subsequently mitigating effect of the fraud attack, the method including initially receiving characteristics for transactions, aggregating the characteristics according to one or more predetermined time periods into respective aggregations for the characteristics, and determining one or more outliers for the aggregations. The method may further include determining whether the one or more outliers for the aggregations indicate a fraud attack, by converting the outliers into input for a machine learning model of a machine learning model suite comprising a plurality of other machine learning models, and applying the input to the machine learning model and, in response, obtaining a determination of whether the one or more outliers for the aggregations indicate a fraud attack with respect to the one or more predetermined time periods. The method may further include, for any indicated fraud attack, cataloging one or more fraud patterns for the corresponding one or more aggregations, and based on the cataloging, determining one or more rules being satisfied by the one or more fraud patterns for the corresponding one or more aggregations. The method may further include notifying the entity of any information with respect to an indicated fraud attack, and retraining, in real-time, the machine learning model and one or more of the plurality of other machine learning models according to one or more of (i) the aggregations for the characteristics, (ii) the one or more outliers for the aggregations, (iii) the one or more fraud patterns for the corresponding one or more aggregations, (iv) the one or more rules being satisfied by the one or more fraud patterns for the corresponding one or more aggregations, or (v) any combination thereof and in response to the retraining, determining, by at least one of the plurality of other machine learning models in real-time, approval or disapproval of one or more other transactions for which characteristics are subsequently received.

Embodiments may further include a system implementing the above method.

Embodiments may include a method and system regarding identifying fraud attack on an entity and subsequently mitigating effect of the fraud attack, the method including receiving characteristics for transactions, aggregating the characteristics according to one or more predetermined time periods into respective aggregations for the characteristics, determining one or more outliers for the aggregations, and determining where the one or more outliers for the aggregations indicate a fraud attack. The indication can be provided by converting the outliers into input for a machine learning model, and applying the input to the machine learning model and, in response, obtaining a determination of whether the one or more outliers for the aggregations indicate a fraud attack with respect to the one or more predetermined time periods.

The method and system can further regard, for any indicated fraud attack, cataloging one or more fraud patterns for the corresponding one or more aggregations such that based on the cataloging, the method and system can also regard determining one or more rules being satisfied by the one or more fraud patterns for the corresponding one or more aggregations. The method and system can also regard notifying the entity of any information with respect to an indicated fraud attack.

DETAILED DESCRIPTION OF THE INVENTION

Figure 1:
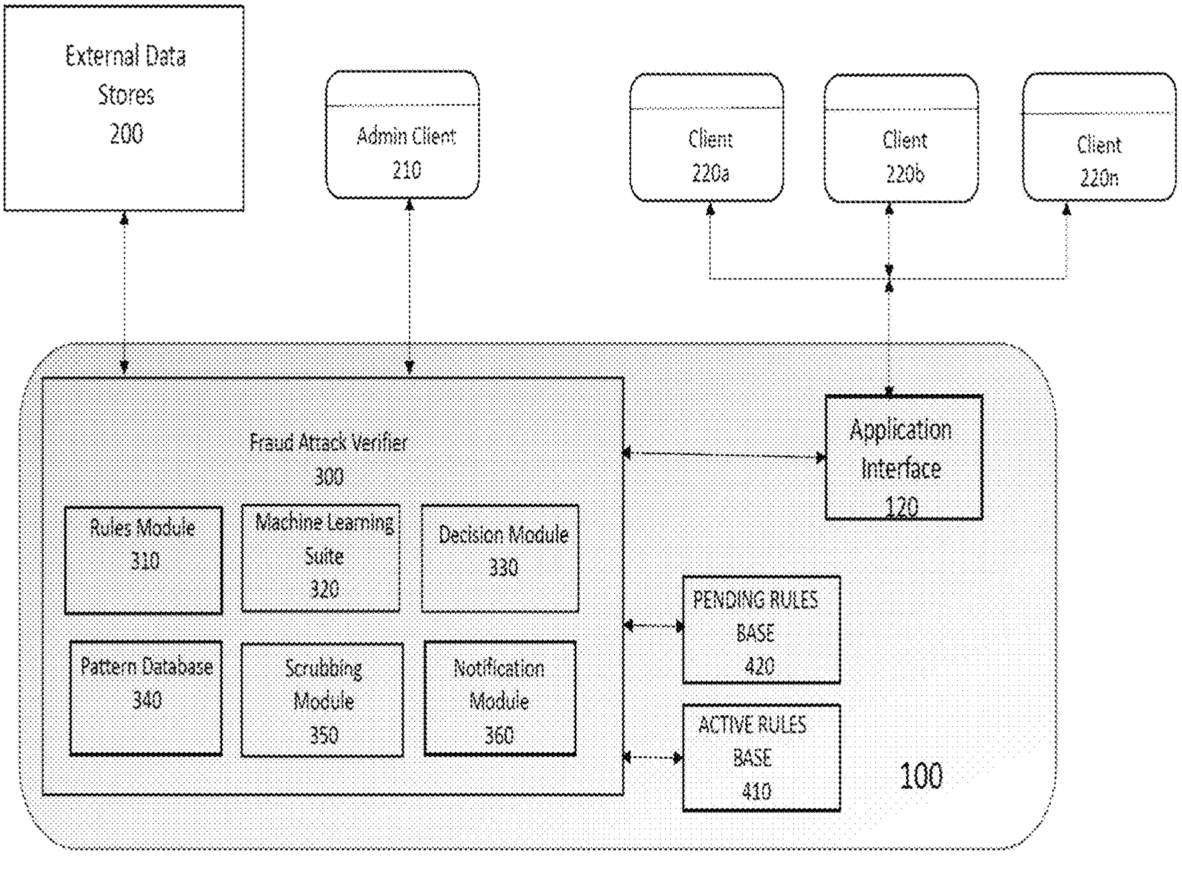
FIG. 1 illustrates elements of a Fraud Attack Verifier (FAV) in association with various components with which it is configured to communicate in order to verify whether transaction data received for a predetermined time period represents a fraud attack, according to embodiments herein.

The present disclosure will now be described in terms of various exemplary embodiments. This specification discloses one or more embodiments that incorporate features of the present embodiments. The embodiment(s) described, and references in the specification to "one embodiment", "an embodiment", "an example embodiment", etc., indicate that the embodiment(s) described may include a particular feature, structure, or characteristic. Such phrases are not necessarily referring to the same embodiment. The skilled artisan will appreciate that a particular feature, structure, or characteristic described in connection with one embodiment is not necessarily limited to that embodiment but typically has relevance and applicability to one or more other embodiments.

In the several figures, like reference numerals may be used for like elements having like functions even in different drawings. The embodiments described, and their detailed construction and elements, are merely provided to assist in a comprehensive understanding of the present embodiments. Thus, it is apparent that the present embodiments can be carried out in a variety of ways, and does not require any of the specific features described herein. Also, well-known functions or constructions are not described in detail since they would obscure the present embodiments with unnecessary detail.

The description is not to be taken in a limiting sense, but is made merely for the purpose of illustrating the general principles of the present embodiments, since the scope of the present embodiments are best defined by the appended claims.

It should also be noted that in some alternative implementations, the blocks in a flowchart, the communications in a sequence-diagram, the states in a state-diagram, etc., may occur out of the orders illustrated in the figures. That is, the illustrated orders of the blocks/communications/states are not intended to be limiting. Rather, the illustrated blocks/communications/states may be reordered into any suitable order, and some of the blocks/communications/states could occur simultaneously.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items. As used herein, the singular forms "a", "an" and "the" are intended to include the plural forms as well, unless the context clearly indicates otherwise.

The word "exemplary" is used herein to mean "serving as an example, instance, or illustration." Any embodiment described herein as "exemplary" is not necessarily to be construed as preferred or advantageous over other embodiments. Additionally, all embodiments described herein should be considered exemplary unless otherwise stated.

Aspects of the present disclosure are directed to fraud identification and prevention. A Fraud Attack Verifier (FAV) can discern between mere isolated instances of transaction data representing one or more fraud patterns (i.e., configurations of transaction data solely matching fraudulent activities with high probability independent of time concentration(s)) and a fraud attack representing high volumes for those patterns occurring during a predetermined time period which has occurred prior to the time of discernment (i.e., inspection). In this regard, the FAV can employ detection for a delineated, time-based frequency for patterning of such transaction data which, when detected, can designate actual inundation of fraud in transactions considered by a principal entity (i.e., an entity that has requested scoring of transaction data and identification of fraud attack). In some embodiments, the FAV can additionally inspect qualification for other candidate entities which may be susceptible to a same or similar fraud attack as had been detected for the aforementioned transaction data of the principal entity. In other words, though such candidate entities may themselves possess differing transaction data, the FAV may be enabled to correlate various characteristics for those candidate entities to the transaction data corresponding to a principal entity that gave rise to detection of a fraud attack. In some embodiments, the FAV can conduct detection of the fraud attack in accordance with one or more instructions issued by the principal entity, and thereafter notify the principle entity and/or other candidate entities of the occurrence of the fraud attack.

Referring to FIG. 1, there is illustrated a Fraud Detection System (FDS) 100 according to one or more embodiments herein. FDS 100 may reside on a single cloud based server although it is also possible for various components of FDS 100 (as described herein) to reside on separate servers. By way of example, FDS 100 may be a computer implemented application which resides on a computing server. As will be apparent from the discussion herein, FDS 100 may include and/or implement all appropriate software and/or hardware for carrying out its applicable fraud detection and related capabilities.

FDS 100 preferably includes Fraud Attack Verifier (FAV) 300, which itself is comprised of a number of modules as discussed further herein. FAV 300 operates to detect patterning of transaction data (and other data as discussed herein) representing a fraud attack in response to receipt of transaction data from one or more principal entities. These detections are generated in response to requests originating from clients 220*a*, 220*b* . . . 220*n*. FDS 100 may be accessed through the internet or any other private or public network by one or more clients 220.

Each of clients 220 may be personal computers, laptops, handheld computing devices such as smartphones or tablets or any other device capable of providing the required connectivity and display. In some embodiments, a client 220 may be a computing application operated by a customer (i.e., a principal entity) which requires fraud scoring data to process transaction requests. For example, client 220 may be an application or set of applications operated by a financial institution which processes requests for new credit cards made by customers of that financial institution. Herein, the terms “transaction,” and “transaction request” can mean any event for which fraud can be detected via analysis and scoring of information used in connection with the event, and include, for example, an application for a business or other type of account opening, an application providing an account information update, an application for a credit check, any type of application for a background check or identity verification, an application for an employment check or verification, etc. That is, the subject information for which fraud may be detected can be information submitted during an initial stage (i.e., application stage) of an activity toward which an application is directed (e.g., account opening, employment, etc.) In these regards, for instance, it is contemplated that embodiments herein may be employed to detect submission of fraudulent information forming part of a transaction or a transaction request. For example, it is contemplated that embodiments herein can detect fraud for information submitted as part of any of the aforementioned applications such that the activity toward which an application is directed (e.g., an account opening) ought not to proceed.

Clients 220 interact with FDS 100 such that data may be communicated between them via application interface 120 and such that FDS 100 may process fraud score requests made by clients 220 with regard to one or more of the above types of applications made by individuals or entities such as organizations. Application interface 120 may comprise one or more application programming interfaces (APIs) that permit applications associated with client 220 to communicate with FDS 100.

Also shown in FIG. 1 is admin client 210. Admin client 210 may comprise a personal computers, laptops, handheld computing devices such as smartphones or tablets or any other similar device. Admin client 210 is operative to allow users to configure, maintain and support the operation of FDS 100. For example, a user may use admin client 210 to interact with FDS 100 to set parameters regarding what is required to invoke the transition from an active rules base to a pending rules base as discussed in further detail below.

External data stores 200 may also be present according to the teachings of one or more embodiments herein. External data stores 200 may comprise one or more external databases, data sets, systems, applications, rules bases and/or other sources of data which is used by FDS 100 to generate fraud scores and/or to generate and/or update the rules bases used by FDS 100 as further described herein. By way of example, external data stores 200 may comprise credit reporting databases, demographic databases, reported and known fraud data, financial transaction data as well as other sources of data useful to FDS 100 in generating accurate fraud scores via rules based methodologies.

Returning now to the specific components of FDS 100, FDS 100 may include various components for detecting a fraud attack and/or potential therefor, as well as for notifying one or more principal and/or candidate entities of such attack or potential therefor. In one embodiment, these components may include application interface 120 (described above), active rules base 410, pending rules base 420 and the various components of FSE 300. Each of these components and their associated functionality are more fully described below. In particular, active rules base 410 and pending rules base 420 may comprise one or more rules and/or conditions applicable to transaction data of a principal entity requesting fraud scoring of transmitted transaction data.

FDS 100 may reside on one or more physical servers. These servers may include electronic storage, one or more processors, and/or other components. The servers may also include communication lines, or ports to enable the exchange of information with a network and/or other computing platforms. The servers may include a plurality of hardware, software, and/or firmware components operating together to provide the functionality attributed herein to FDS 100.

Electronic storage associated with the servers may comprise non-transitory storage media that electronically stores information. The electronic storage media of electronic storage may include one or both of system storage that is provided integrally (i.e., substantially non-removable) with servers and/or removable storage that is removably connectable to the servers via, for example, a port or a drive.

Electronic storage may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage may include one or more virtual storage resources (e.g., cloud storage, a virtual private network, and/or other virtual storage resources). Electronic storage may store software algorithms, information determined by processors, information received from servers, information received from clients 220, and/or other information that enables the servers to function as described herein.

While an exemplary architecture is described above, it will readily be understood by one of skill in the art, that an unlimited number of architectures and computing environments are possible while still remaining within the scope and spirit of the present embodiments.

Returning now to the specific components of FDS 100 shown in FIG. 1, FAV 300 includes various components which are described hereinbelow. Operation(s) of each of these FAV 300 components will be described in further detail below with reference to FIGS. 2-4.

As shown, FDS 100 includes each of active rules base 410 and pending rules base 420, as well as rules module 310 of FAV 300, which can coordinate to evaluate which rules base more accurately reflects an appropriate probability regarding whether transaction data submitted to FDS 100 is actually fraudulent. Relative to discussion of these components as provided in commonly owned U.S. Pat. No. 11,544,715, entitled, "SELF LEARNING MACHINE LEARNING TRANSACTION SCORES ADJUSTMENT VIA NORMALIZATION THEREOF ACCOUNTING FOR UNDERLYING TRANSACTION SCORE BASES RELATING TO AN OCCURRENCE OF FRAUD IN A TRANSACTION," issued on Jul. 4, 2023, and incorporated by reference herein in its entirety, FDS 100 can be operative to evaluate feedback received from a principal entity so as to assess predictions for whether transaction data (as discussed in the incorporated document above) is accurately predicted by FDS 100 to be fraudulent. In this regard, for instance, a model assessment module of the aforementioned incorporated patent can compare performances of each of the rules bases 410 and 420, according to normalization as discussed in the aforementioned patent, as against relevant feedback for submitted transaction data. Thereafter, a module management module of such patent, and representing rules module 310 herein, can substitute the superiorly performing rules base in anticipation of rescoring of same, previously scored transaction data or other transaction data in which such other data can be data for a different transaction request.

FAV 300 can further include a machine learning (ML) suite 320 providing a compiler and several ML models assigned dedicated functions. For instance, suite 320 can include a fraudulent transaction detection (FTD) model which can be defined by model assessment module of the aforementioned, commonly owned patent. In review, FTD model can receive transaction data as ML model input and score such data to yield a probability of whether that data is fraudulent. Suite 320 can further include the compiler to compile or aggregate characteristics for transactions assessed by the FTD model, where the characteristics can be transaction data, determined fraud probability and/or reason codes for the probability. Herein, the term "transaction data" can include, for example, data submitted by an individual in an attempt to proceed with a transaction (e.g., name, date of birth) as well as any data associated with any device (phone, computer, etc.) used for the submission. Suite 320 can further include a fraud attack decider (FAD) model that can receive scored transaction data and decide whether, according to various characteristics, as discussed hereinafter, that data represents a fraud attack as defined herein. Suite 320 can also include an attack pattern association (APA) model which, for any determined fraud attack, crystallizes recognition for patterning among fraudulent transaction data (e.g., the patterning including trends in PII including, but not limited to, address, email information, phone information, and IP address and individual aspects thereof). For instance, the APA model may employ an isolation forest technique to do so. Suite 320 can include an attack pattern refiner (APR) model that can formulate one or more rules for which the satisfaction thereof by transaction data can indicate an instance of a fraud attack. A PII detector (PIID) model may also be included among the machine learning suite 320 in order to flag any element of PII (a) included in the transaction data patterned according to the APA model and (b) that deviates from one or more predetermined baselines. An example of such a PII element may be a same email or a same phone number appearing repeatedly within the patterned transaction data. Still further, suite 320 can include a fraud diffusion (FD) model that, for any detected fraud attack against a principal entity, can analyze whether such an attack can be likely to have occurred, or might occur, if same or similar transaction data transmitted by that principal entity were applicable to another, i.e., "candidate," entity. This way, FAV 300 of FDS 100 can evaluate pervasiveness of prior and/or ongoing fraud attack across, for instance, businesses within a same industry or within different industries relying on similar-type transaction data. In this way, transaction data corresponding to a principal entity and one or more candidate entities can be aggregated consortium data since each of the entities can offer such data in the interest of mitigating perpetration of fraud.

A "machine learning model" or "model" as used herein, refers to a construct that is trained using training data to make predictions or provide probabilities for new data items, whether or not the new data items were included in the training data. For example, training data for supervised learning can include positive and negative items with various parameters and an assigned classification. Examples of models include: neural networks (traditional, deeps, convolution neural network (CNN), recurrent neural network (RNN)), support vector machines, decision trees, decision tree forests, Parzen windows, Bayes, clustering, reinforcement learning, probability distributions, decision trees, and others. Models can be configured for various situations, data types, sources, and output formats.

To illustrate, the FTD and/or FAD model of suite 320 can be trained with supervised learning and use training data that can be obtained from a history of transaction data. More specifically, each item of the training data can include an instance of a prior transaction matched to one or more scores of probability and/or determinations (i.e. reasons) for a fraudulent occurrence. The matching can be performed according to a predetermined algorithm configured to receive transaction data from a historical record and pair it with results of analysis of the record, such as what types fraud occurred (e.g., improper PII, forged ID, etc.). During the model training, a representation of the transaction data (e.g., histograms of ID images, values representing PII, etc.) can be provided to the model (e.g., each as an element of a vector). Then, the output from the model, i.e., predicted fraudulent occurrence(s) from the model, can be compared to actual feedback for the transaction(s) and, based on the comparison, the model can be modified, such as by changing weights between nodes of the neural network or parameters of the functions used at each node in the neural network (e.g., applying a loss function). After applying each of the pairings of the inputs (prior transaction data) and the desired outputs (fraud probability and/or bases for occurrences of fraud) in the training data and modifying the model in this manner, the model is trained to evaluate new instances of transaction data in order to determine fraud bases for transaction data. This way, FDS 100 can re-train existing rules or provide new rules for an appropriate pending rules base 420 based on the determined fraud bases. Aspects and operation of others of the ML models pertaining to suite 320 are described below in relation to at least FIG. 2.

FAV 300 may further include decision module 330 which can, using the rules determined by the APR model, forward such fraud detection rules for storage in a pattern database 340. FAV 300 may still further include a scrubbing module 350 that can, for the patterning refined by the APR model, receive such patterning and construct an "alert" listing of one or more transaction data for refined patterning. Thus, for temporal additions to the listing, the FAV 300 can, in this way, provide a simple "look-up" by which one or more of the FTD and FAD models can be enabled to reevaluate transaction data for fraudulent and/or attack activity. In order to interact with clientele, such as a principal entity herein, FDS 100 can employ a notification module 360 of FAV 300 in order to make such an entity aware of whether a fraud attack has occurred, whether re-scoring for transaction events is necessary, etc. These and other operations of FAV 300 are discussed below in relation to FIGS. 2-4.

Figure 2:
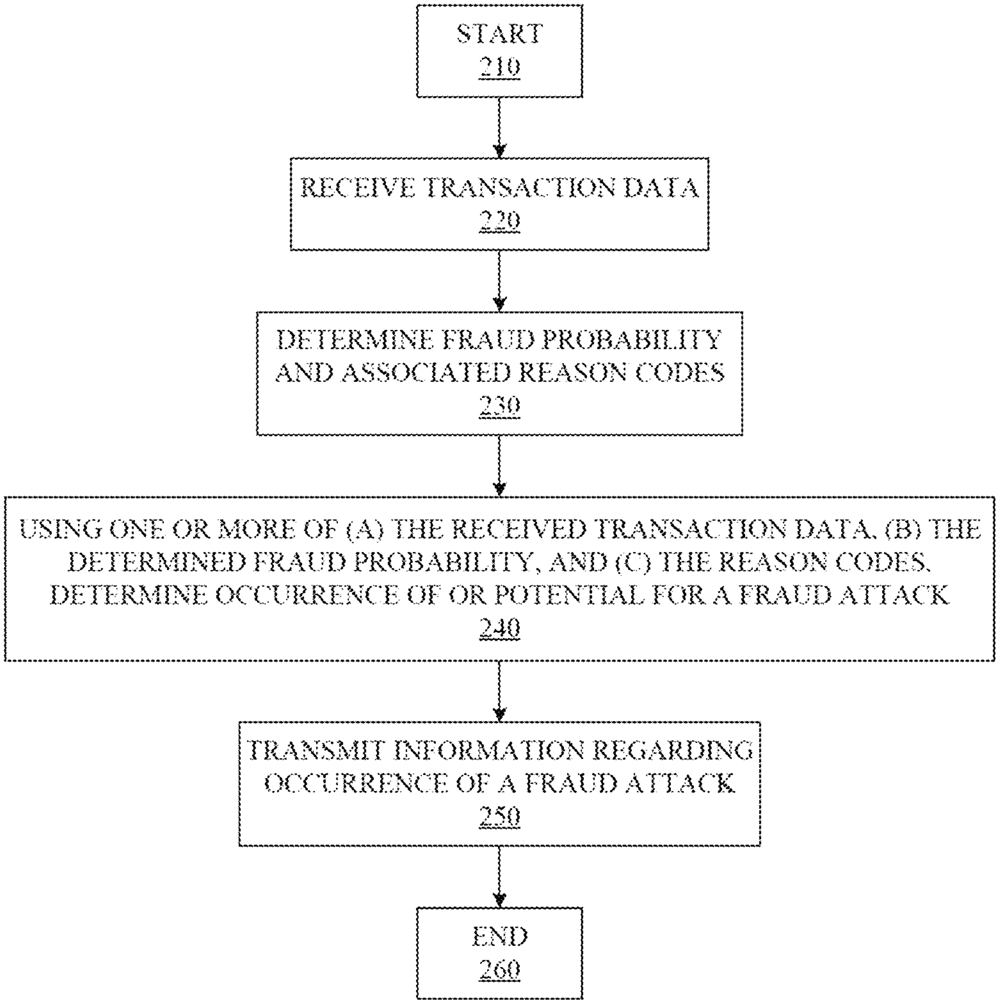
FIG. 2 illustrates a high-level flow diagram of a process of detection of a fraud attack, according to embodiments herein.

Referring to FIG. 2, there is illustrated a process for detecting a fraud attack relative to transaction data collected for a principal entity. Therein, after initiation of the process at 210, the FTD model of suite 320, as discussed above, can receive such transaction data at 220. Upon receipt, the FTD model can determine associated fraud probability and reason codes at 230. Here, such probability can range from, for example, 0 to 1, with increasing magnitude indicating higher likelihood of fraud for the transaction data. Accompanying the discerned level of probability, reason codes may be provided to indicate bases for the probability. A non-exhaustive listing of such codes can include, for instance, improper PII, improper ID, email address not matching with sender. In accordance with the fraud probability discerned by the FTD model, the process can, at 240, use one or more of transaction characteristics, including, for example, (A) the received transaction data, (B) the determined fraud probability, and (C) the associated reason codes to determine whether a fraud attack has occurred or whether a potential for the same is presented. More specifically, the FAD model of suite 320 can receive the characteristics from the FTD model and examine a series of rules-based, time-delineated aggregations for the characteristics to assess whether one or more anomalies signaling the occurrence of or potential for a fraud attack are present. As will be understood from the discussion herein, the characteristics can be received continually and can be voluminous combinations for any one time period such that manual interpretation (e.g., sorting and calculation) of the subsequently discussed aggregations cannot be practically performed in the human mind without introduction of significant computational error. Herein, the aggregations for the characteristics can comprise one or more of the aggregations including, but not limited to, skew, volume, occurrence of email data, occurrence of reason codes, occurrence of personally identifiable information, and/or occurrence of clustered data concatenated from either email, internet protocol, and/or or phone information. Anomalies for the aggregations can manifest as outliers for the characteristics, where any anomaly can be based on one characteristic that has a prevalence therefor that exceeds a respective outlier threshold of mean+/− two (2) standard deviations for a respective inspection window. As an example, the aggregations can include skew analysis for the received characteristics so as to determine the breadth of variability thereof. Here, the skew can be defined as 3(mean−median)/standard deviation over a predetermined period of time, e.g., the preceding hour of received transaction data over a designated inspection window (such as the last 50 hours to obtain an appropriate sample size). As such, Table 1 below represents corresponding measurements.

TABLE 1

| Hour | model 1 skew | Rolling average | Standard dev |
|---|---|---|---|
| 5:00 PM | −0.218 | −0.545 | 0.551 |
| 4:00 PM | −0.236 | . . . | . . . |
| 3:00 PM | −1.181 | . . . | . . . |
| . . . | . . . | . . . | . . . |

To illustrate, where the 5:00 PM hour draws a skew of −0.218, analysis for whether the same represents an outlier for (FTD) model performance would encompass (−0.545+/−2*0.551). According to the resultant range of −1.647 and 0.557, the skew of −0.218 would not represent an outlier.

As another example, the aggregations can include mere volume of transaction data received by a principal entity over the course of an hour of the day, examined for a predetermined preceding interval, providing an inspection window, e.g., hourly for the last 20 days. Likewise as in the case of the skew examination above, the volume aggregations can be measured against the outlier threshold. As another example, the aggregations compiled by the FAD can entail a count of email domains presented by the transaction data over a predetermined examination period of, for example, the last 50 hours. Should the count of any one same email domain exceed the outlier threshold, such domain can be designated as an outlier domain. As still another example, the aggregations can comprise those same reason codes compiled for any given hour of transaction data, and an outlier can be determined in accordance with whether appearance of such code or codes occur(s) in excess of the outlier threshold. An exemplary listing of the reason codes that may be the subject of aggregation include those listed below. In other words, such listing may, in some circumstances, be subject to change so as to capture one or more permutations for the aggregations according to, for example, time of capture for the aggregations, implemented technology and/or aspects of user history when using a particular device for the implemented technology.

Phone characteristics and usage metrics

Binned length of phone being in service

IP geolocation

Email domain

Email age

Properties of the email character composition such as number of digits or special characters, etc.

Other statistical properties on embedded information of the incoming variables

Still more, the aggregations can include hourly examinations for whether certain same clusters of transaction data appear as concatenated transaction data and are presented with such a frequency that exceeds the discussed outlier threshold. Exemplary clusters are listed below.

Email example cluster (as a concatenation of values that indicate one or more combinations of aspects below)

Number of vowels in email handle

Number of consonants in email handle

Number of digits in email handle

Number of special characters in email handle

Email domain

Other sets of string properties, such as probabilistic analysis of different components Phone example cluster (as a concatenation of values that indicate one or more combinations of aspects below)

Phone line type (landline, mobile, etc)

Area code

Number of distinct digits in phone number

Duration for phone in service

Such above exemplary clusters can be evaluated as standalone clusters, or in combination, together with clusters of information corresponding to an implementing device so as to, for example, assess aspects of corresponding clustered IP data (e.g., IP domain and ISP provider relative to an email cluster).

In some embodiments, the aggregations discussed above may be adjusted with respect to one or more of the length of the inspection window, the outlier threshold (e.g., using Nelson rules instead to identify outliers), the interval over which transaction data is aggregated (i.e., over a ¼ hour or overlapping portions of an hour). Alternatively or in addition, the aggregations discussed above may be procured according to one or more of the features stated below.

Internet Service provider volume (compared against moving average)

Phone Carrier volume

Geolocation volume, based on IP location, or area code of the phone, or plain application address Additional moments of the models, beyond the skew Industry-level aggregations Consortium-level aggregations (i.e., aggregations across similar business types)

Using one or more of the above aggregations, the FAD model of suite 320 can implement a Random Forest regime to discern whether any one aggregation therein represents a fraud attack. Here, the FAD model can be trained with prior training characteristic aggregations having characteristics known to represent fraud attacks. In this way, the FAD model can identify which aggregation or multiples of aggregations, optionally in conjunction with their determined fraud probabilities and reason codes, represent fraud patterns occurring within a predetermined time period that qualifies aggregations for those patterns as a fraud attack. In at least one example, the predetermined time period can be a period of the inspection window (e.g., past hour, past "x" number of days evaluated for each hour, a holiday) corresponding to the outlier threshold discussed above. Herein, a fraud pattern may be understood as one or more transaction data satisfying one or more rules or reason codes defining such data as being associated with fraudulent activity, whereas such rules or codes are not associated with other activity.

Once a fraud attack has been identified by the FAD model, the aggregations for that attack can undergo further analysis to, for instance, filter (by the APA model) transaction data patterns for the aggregations, identify (by the PIID model) pervasive PII elements, and develop (by the APR model) one or more fraud detection rules that can later be provided to the FTD and/or FAD models, for example.

At 250 and prior to the process ending at 260, the process can transmit information regarding an occurrence of the fraud attack. In some embodiments, the information can be transmitted to a principal entity and include, for example, notification of whether a fraud attack has occurred, whether rules used to determine a fraud attack have undergone change (i.e., the changed rules), rescoring for one or more events for the aforementioned aggregations (by, for example, the FAD model). The particular type of notification to be received can depend on occurrences for the fraud attack and/or various types of permissions provided by a principal entity. As an example, if a fraud attack is deflected by the FTD model of suite 320 (i.e., where, as a result of application of rules within FTD model, a transaction recommendation of "disapproved" is generated due to fraud probability among aggregations being determined as exceeding a predetermined fraud measurement threshold (e.g., where the threshold can be the above-discussed outlier threshold or, optionally, another predetermined threshold) and the aggregations thus define a fraud attack as discussed herein)), a principal entity may be simply notified of the occurrence of the attack. As another example, if a principle entity is determined to have been the victim of a fraud attack, such entity may, for the transaction data examined for the aggregations, perceive transmitted changes in one or more corresponding fraud detection rules, an increase in assignment of scoring to event data for the aggregations, rescoring of events for such aggregations and/or a request to resubmit transaction data.

Figure 3:
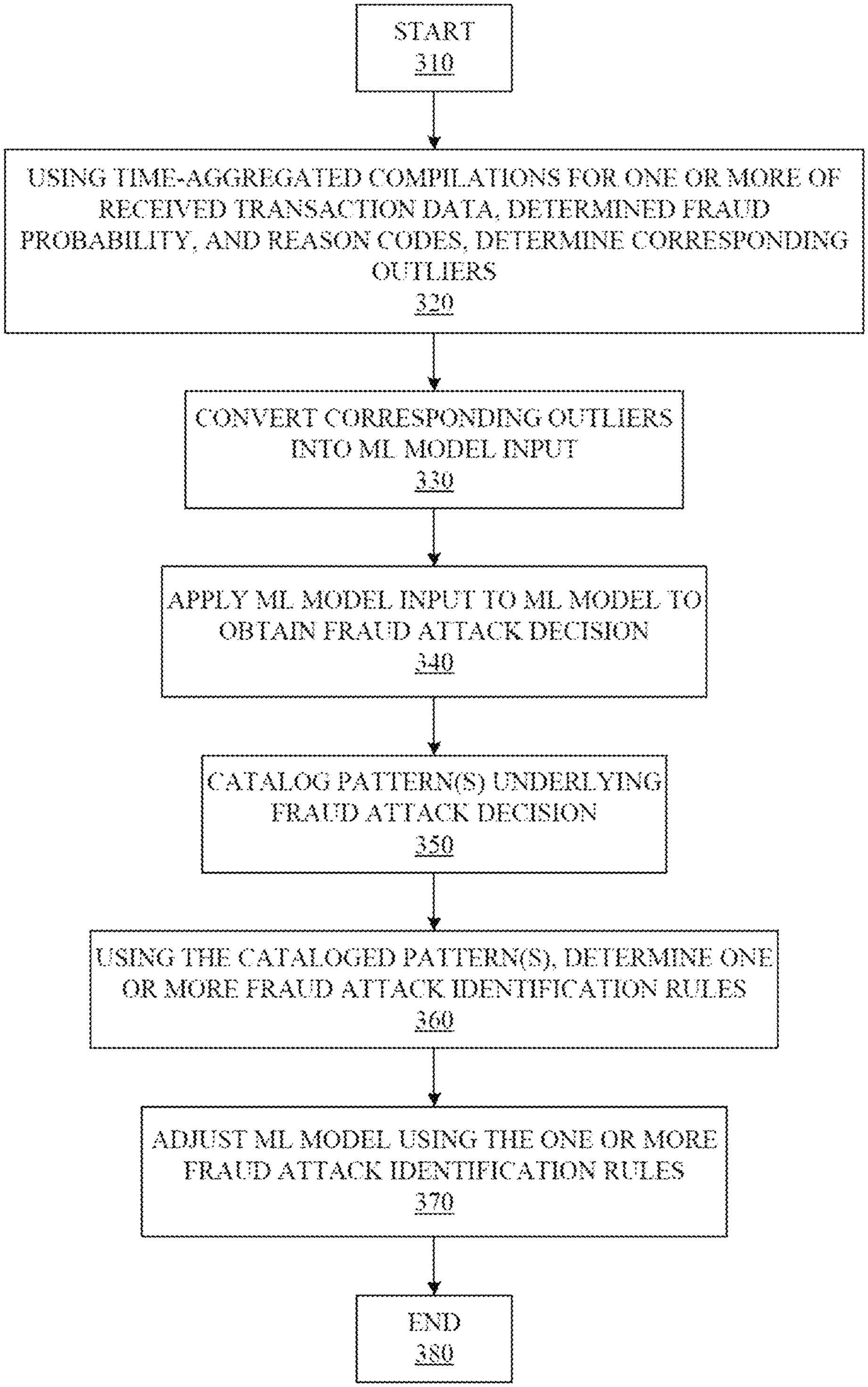
FIG. 3 illustrates a flow diagram of a process for determining one or more fraud attack rules, according to embodiments herein.

Referring to FIG. 3 providing a process for determining one or more fraud attack rules by which the FAD model can identify a fraud attack as having occurred for the aforementioned inspection window or as potentially occurring for a forthcoming inspection window, the process may begin at 310. Here, the process of FIG. 3 can be performed as a sub-process for block 240 of FIG. 2 and proceed at 320 to use time-based aggregations for transaction characteristics (e.g., received transaction data, determined fraud probability, and reason codes) to determine corresponding outliers for the aggregations. The outliers may be determined according to the above discussed outlier threshold assessed for a corresponding inspection window, for example. In this regard, should measurement for transaction characteristics according to one or more aggregations exceed the outlier threshold for a corresponding inspection window, the FAD can identify, for the aggregation and underlying characteristics, that a fraud attack has occurred.

At 330, the process can convert such outliers into ML model input. For example, data items for the outliers can be entered into a sparse vector that the ML model (e.g., the FAD model) is trained to receive. Once converted, the process can, at 340, apply the ML model input to the FAD model to obtain a fraud attack decision. In this case, the FAD model can be trained to identify fraud attack with training data including prior instances of known fraud attacks (e.g., outliers for one or more transaction characteristic aggregations occurring according to a predetermined inspection window). As output, therefore, the FAD model can render a fraud attack decision indicating, in the affirmative, that, due to one or more outliers having corresponding matches, a fraud attack has occurred or that a fraud attack is more than likely (e.g., greater than 50%) to occur. Alternatively, the fraud attack decision can be in the negative such that matching for outliers is absent.

Where existence or potential for fraud attack is in the affirmative, the process can proceed, at 350, to catalog fraud patterns for the aggregations that underlie the affirmance. To do so, the process can employ a predetermined algorithm (e.g., an isolation forest regime) to distinguish, for the aggregations, those transaction data that define outlier data most prevalently occurring for the aggregations and causing the affirmative fraud attack decision to have been rendered by the FAD model. That is, the cataloging can be a listing of the outliers according to types of aggregations. In one or more embodiments, part of such cataloging can include identifying one or more same PII elements (e.g., email, phone number, social security number) that are pervasive for the aggregations causing the affirmative fraud attack decision. In this instance, identification for the PII elements can encompass and result from a comparison for those elements against a baseline for all assessed PII elements in an aggregation as well as a baseline for a specific one corresponding element (e.g., phone number to phone number). This way, and through this combined analysis, dummy (i.e., unrequired and/or privileged transaction data that is masked by generic data) data can be ferreted out from the cataloging, and thus identified as not contributing to the affirmative fraud attack decision.

At 360, the process can, using the cataloged fraud patterns for the aggregations of transaction data, determine one or more fraud attack identification rules according to the APR model of suite 320. In one or more embodiments, the rules can be devised via assessment of the cataloged patterns that prescribes inclusion of one or more patterns or combinations of patterns exceeding a predetermined outlier threshold for a corresponding inspection window. For example, a sample rule indicating a fraud attack pattern, for fraud attack characteristics corresponding to the aforementioned aggregations, may include three (3) similar reason codes and three (3) other unrelated alerts (e.g., volume, skew) occurring twice in the past two (2) hours or one (1) PII cluster, two (2) related reason codes, and two (2) unrelated aggregations occurring in the past three (3) hours. In this regard, the process can isolate fraud attack characteristics and aggregations therefor that specify occurrence and/or potential for occurrence of a fraud attack.

At 370 and prior to the process ending at 380, one or more of the FTD, FAD, APA, and PIID models of ML suite 320 of FIG. 1 can be adjusted, in real-time, using one or more portions of transaction characteristics and/or aggregations therefor underlying the discussed fraud attack identification rules. In an example, one or more fraud attack characteristics and corresponding rules developed by the APR model can be fed to the FTD model so as to improve or replace existing rules thereof with the goal of more definitively identifying a pattern of fraud that, due to increased volume over a given inspection window, would further identify a fraud attack recognizable by a FAD model already updated according to incorporated rules for such same or similar portions of the transaction characteristics and/or aggregations therefor. In other words, as continual and/or increasing amounts of data are received by one or more of the FTD, FAD, APA, and PIID models of suite 320 of FIG. 1, one or more of such models can be updated (i.e., retrained), in real-time, according to any one or more of transaction characteristics, aggregations for those characteristics, fraud patterns corresponding to the aggregations, and attack pattern identification rules developed by the APR model. This way, and due to the real-time interactions and transfer of information among the aforementioned APR, FTD, FAD, APA, and PIID models, data associated with an incoming transaction request and received at, for instance, the FTD model, can be more immediately identified, according to, for example, the discussed outlier threshold, as representing a fraud attack. That is, because of the real-time interactions and transfer of information among the aforementioned APR, FTD, FAD, APA, and PIID models, the FTD model, for instance, can determine, for subsequently received characteristics for transactions, whether a given transaction thereof should be approved or disapproved according to a real-time retraining of the FTD model based on the aforementioned interactions and transfer of information. In an embodiment, the decision on whether to approve a transaction according to characteristics received therefor can be based on the FTD model's implementation of the outlier threshold discussed herein, where such threshold is employed according to FTD model rules resulting from the retraining or according to FTD rules existing prior to the retraining. As another example, the FAD model can, as a result of the real-time interactions and transfer of information among the aforementioned APR, FTD, FAD, APA, and PIID models providing for their real-time retraining, more immediately identify an instance of a fraud attack. Hence, such real-time interaction between the models can be invaluable in enabling, for example, the real-time notification to a principle and/or candidate entity of the presence of a fraud attack. Accordingly, such an entity or entities can enact measures commensurate with the notification to thwart success of an intended, subject fraud attack.

Figure 4:
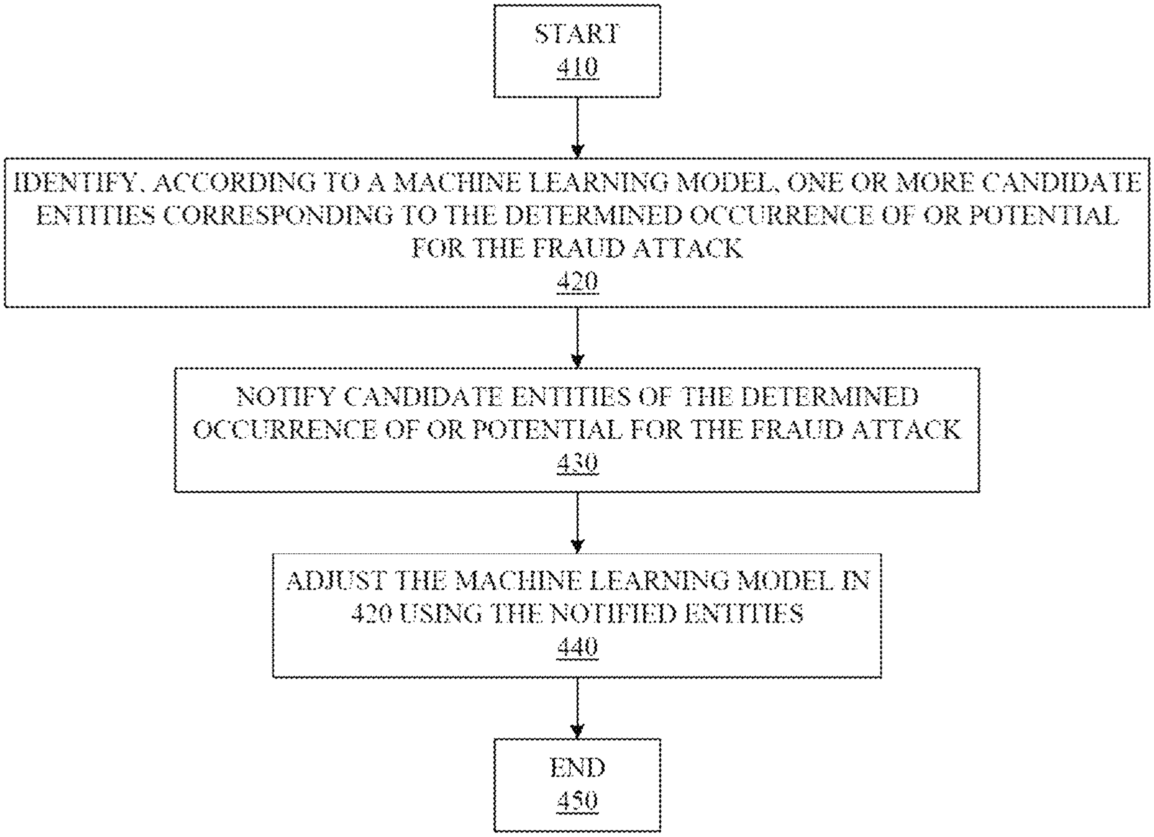
FIG. 4 illustrates a flow diagram of a process for identifying one or more candidate entities that, based on received transaction data for at least one other entity, may be susceptible to a fraud attack.

Referring to FIG. 4, there is provided a process for identifying one or more candidate entities that, based on received transaction data for at least one other entity, may be susceptible to a fraud attack. Starting at 410, the process can proceed to 420 whereat such process can identify, according to a ML model, one or more candidate entities corresponding to the determined occurrence of or potential for the fraud attack determined in FIGS. 2-3. Here, the ML model can be similarly trained as the FTD and FAD models of suite 320 of FIG. 3, with the distinction that training data can include candidate entities (i.e., entities other than the principal entity for which FIGS. 1-3 are applicable) paired with prior training data (e.g., outliers for aggregations) identifying fraud attacks and updated with any such rules as devised by the APR model discussed above. In these regards, candidate entities shall mean any such entities sharing, for example, one or more of common industry purpose and goal as that possessed by a principal entity as discussed herein, same or similar market capitalization, similar naming for which trademark protection is or not available under U.S. law, and same or similar customer/clientele. The term "similar" shall mean+/−10% of any such aforementioned measurable statistic relative to such statistic when measured for a principal entity.

At 430, the process can notify identified candidate entities of any occurrence of or potential for the fraud attack determined according to FIGS. 2-3. Such notification can be in accordance with notifications discussed above as would be provided to a principal entity. In other words, the notifications can be, for same or similar transaction data corresponding to the candidate entities, limited to those types of notifications that such principal entity would receive (e.g., in accordance with instructions provided by the principal entity as to which or how fraud attacks are to be detected and notified).

At 440, and prior to ending at 450, the process can adjust the ML model to update its training data to include the notified candidate entities and the corresponding fraud attack data. This way, the process can, in a next iteration of identification for candidate entities, provide an increased pool from which such entities can be selected.

In view of the above, it will be understood that FDS 100, through implementation of at least the FAD and APR models, may achieve detection of one or more fraud attacks that might otherwise not be accurately recognized/classified for myriad fraud patterns. Examination for delineated, time-based frequency for patterning of fraud within transaction data can be automatically conducted, in real-time, and in accordance with real-time transfer of data to and throughout one or more of the machine learning models discussed herein. As a result, a continuing effect of any fraud attack that has already occurred can be thwarted due to real-time provision of notification of such an attack to one or more affected entities.

The present embodiments are not limited to the particular embodiments illustrated in the drawings and described above in detail. Those skilled in the art will recognize that other arrangements could be devised. The present embodiments encompass every possible combination of the various features of each embodiment disclosed. One or more of the elements described herein with respect to various embodiments can be implemented in a more separated or integrated manner than explicitly described, or even removed or rendered as inoperable in certain cases, as is useful in accordance with a particular application. While the present embodiments have been described with reference to specific illustrative embodiments, modifications and variations of the present embodiments may be constructed without departing from the spirit and scope of the present embodiments as set forth in the following claims.

While the present embodiments have been described in the context of the embodiments explicitly discussed herein, those skilled in the art will appreciate that the present embodiments are capable of being implemented and distributed in the form of a computer-usable medium (in a variety of forms) containing computer-executable instructions, and that the present embodiments apply equally regardless of the particular type of computer-usable medium which is used to carry out the distribution. An exemplary computer-usable medium is coupled to a computer such the computer can read information including the computer-executable instructions therefrom, and (optionally) write information thereto. Alternatively, the computer-usable medium may be integral to the computer. When the computer-executable instructions are loaded into and executed by the computer, the computer becomes an apparatus for practicing the embodiments. For example, when the computer-executable instructions are loaded into and executed by a general-purpose computer, the general-purpose computer becomes configured thereby into a special-purpose computer. Examples of suitable computer-usable media include: volatile memory such as random access memory (RAM); nonvolatile, hard-coded or programmable-type media such as read only memories (ROMs) or erasable, electrically programmable read only memories (EEPROMs); recordable-type and/or re-recordable media such as floppy disks, hard disk drives, compact discs (CDs), digital versatile discs (DVDs), etc.; and transmission-type media, e.g., digital and/or analog communications links such as those based on electrical-current conductors, light conductors and/or electromagnetic radiation.

Although the present embodiments have been described in detail, those skilled in the art will understand that various changes, substitutions, variations, enhancements, nuances, gradations, lesser forms, alterations, revisions, improvements and knock-offs of the embodiments disclosed herein may be made without departing from the spirit and scope of the embodiments in their broadest form.

What is claimed is:

1. A method for identifying fraud attack on an entity and subsequently mitigating effect of the fraud attack, the method comprising:

(a) providing a server comprising a plurality of machine learning models, the server executing the plurality of machine learning models to perform the steps of:

receiving transaction characteristics corresponding and limited to transaction data of one or more real-time transactions;

aggregating the transaction characteristics according to one or more predetermined time periods into respective aggregations being limited to correspond to only the transaction characteristics and comprising at least skewness for the transaction characteristics over each of the one or more predetermined time periods;

determining one or more outliers for the aggregations;

determining whether the one or more outliers for the aggregations indicate a fraud attack, by:

receiving the one or more outliers at a predetermined one of the plurality of machine learning models, wherein the predetermined one of the plurality of machine learning models decides, in a first decision iteration, a fraud attack occurrence as being positive or negative based on the one or more outliers for the aggregations and training data comprising (a) prior transaction data defining training transaction characteristic aggregations paired with (b) occurrence of fraud attack due to one or more training rules being satisfied for a condition that one or more training outliers are identified for the training transaction characteristic aggregations during one or more predetermined training time periods; and in response to the fraud attack occurrence in the first decision iteration being decided as positive with respect to the one or more predetermined time periods, blocking the one or more real-time transactions, the training data of the predetermined one of the plurality of machine learning models being modified, for a second decision iteration of whether the one or more outliers for the aggregations indicate the fraud attack or another fraud attack with respect to the one or more predetermined time periods, based on feedback being received from the entity and indicating a presence or an absence of fraud for a respective transaction corresponding to the first decision iteration;

for any indicated fraud attack, cataloging one or more fraud patterns that respectively correspond to one or more of the aggregations;

based on the cataloging, determining one or more rules being satisfied by the one or more fraud patterns for the corresponding one or more aggregations;

updating, as the transaction characteristics are continually received in real time, the one or more training rules of the training data to at least include the one or more training rules being satisfied by the one or more fraud patterns for the corresponding one or more aggregations, the predetermined one of the plurality of machine learning models then being configured to render subsequent decision iterations based at least on the updating; and (b) notifying by a notification module resident on the server, the entity of any information with respect to an indicated fraud attack.

2. The method of claim 1, wherein:

the transaction characteristics comprise one or more of (a) transaction data, (b) determined fraud probability for a transaction, (c) a reason code or reason codes corresponding to a determined fraud probability for a transaction, or (d) any combination thereof.

3. The method of claim 2, wherein:

if the transaction characteristics comprise transaction data, the transaction data comprises one or more of (e) personally identifiable information, (f) email information, (g) phone or other device information, or (h) any combination thereof.

4. The method of claim 1, wherein:
the one or more predetermined time periods comprise respective inspection windows of time over which the transaction characteristics are received.

5. The method of claim 1, wherein:
the aggregations comprise one or more of (i) skew, (j) volume, (k) occurrence of email data, (l) occurrence of reason codes, (m) occurrence of personally identifiable information, (n) occurrence of clustered data concatenated from either email, internet protocol, device or phone information, or (o) any combination thereof.

6. The method of claim 1, wherein:
an outlier comprises any aggregation exceeding a predetermined outlier threshold defined for a predetermined time-based inspection window.

7. The method of claim 6, wherein:
a fraud attack comprises the occurrence of the outlier over the predetermined time-based inspection window.

8. The method of claim 1, wherein:
the cataloging one or more fraud patterns for the corresponding one or more aggregations is in accordance with an isolation forest regime.

9. The method of claim 1, wherein:
the information with respect to an indicated fraud attack comprises one or more of (p) for any disapproved transaction, an indication of an occurrence of the indicated fraud attack, (q) a change in rules employed by the machine learning model to indicate a fraud attack, (r) an increase in scores corresponding to aggregations and employed by the machine learning model to indicate a fraud attack, (s) rescoring for the transaction characteristics comprising transaction data and determined fraud probability, (t) a request to resubmit the transaction characteristics comprising transaction data, or (u) any combination thereof.

10. The method of claim 1, further comprising:
in response to an indication of a fraud attack, adjusting, based on a respective one or more of the aggregations causing the indication, the determining the one or more outliers for the aggregations and the cataloging one or more fraud patterns for the corresponding one or more aggregations.

11. A server for identifying fraud attack on an entity and subsequently mitigating effect of the fraud attack, the server comprising:
(a) a plurality of machine learning models, the server executing the plurality of machine learning models to perform the steps of:
receiving transaction characteristics corresponding and limited to transaction data of one or more real-time transactions;
aggregating the transaction characteristics according to one or more predetermined time periods into respective aggregations being limited to correspond to only the transaction characteristics and comprising at least skewness for the transaction characteristics over each of the one or more predetermined time periods;
determining one or more outliers for the aggregations;
determining whether the one or more outliers for the aggregations indicate a fraud attack, by:
receiving the one or more outliers at a predetermined one of the plurality of machine learning models, wherein the predetermined one of the plurality of machine learning models decides, in a first decision iteration, a fraud attack occurrence as being positive or negative based on the one or more outliers for the aggregations and training data comprising (a) prior transaction data defining training transaction characteristic aggregations paired with (b) occurrence of fraud attack due to one or more training rules being satisfied for a condition that one or more training outliers are identified for the training transaction characteristic aggregations during one or more predetermined training time periods; and
in response to the fraud attack occurrence in the first decision iteration being decided as positive with respect to the one or more predetermined time periods, blocking the one or more real-time transactions, the training data of the predetermined one of the plurality of machine learning models being modified, for a second decision iteration of whether the one or more outliers for the aggregations indicate the fraud attack or another fraud attack with respect to the one or more predetermined time periods, based on feedback being received from the entity and indicating a presence or an absence of fraud for a respective transaction corresponding to the first decision iteration;
for any indicated fraud attack, cataloging one or more fraud patterns that respectively correspond to one or more of the aggregations;
based on the cataloging, determining one or more rules being satisfied by the one or more fraud patterns for the corresponding one or more aggregations;
updating, as the transaction characteristics are continually received in real-time, the one or more training rules of the training data to at least include the one or more training rules being satisfied by the one or more fraud patterns for the corresponding one or more aggregations, the predetermined one of the plurality of machine learning models then being configured to render subsequent decision iterations based at least on the updating; and
(b) notifying, by a notification module resident on the server, the entity of any information with respect to an indicated fraud attack.

12. The computing system of claim 11, wherein:
the transaction characteristics comprise one or more of (a) transaction data, (b) determined fraud probability for a transaction, (c) a reason code or reason codes corresponding to a determined fraud probability for a transaction, or (d) any combination thereof.

13. The computing system of claim 12, wherein:
if the transaction characteristics comprise transaction data, the transaction data comprises one or more of (e) personally identifiable information, (f) email information, (g) phone or other device information, or (h) any combination thereof.

14. The computing system of claim 11, wherein:
the one or more predetermined time periods comprise respective inspection windows of time over which the transaction characteristics are received.

15. The computing system of claim 11, wherein:
the aggregations comprise one or more of (i) skew, (j) volume, (k) occurrence of email data, (l) occurrence of reason codes, (m) occurrence of personally identifiable information, (n) occurrence of clustered data concatenated from either email, internet protocol, device or phone information, or (o) any combination thereof.

16. The computing system of claim 11, wherein:

an outlier comprises any aggregation exceeding a predetermined outlier threshold defined for a predetermined time-based inspection window.

17. The computing system of claim 16, wherein:

a fraud attack comprises the occurrence of the outlier over the predetermined time-based inspection window.

18. The computing system of claim 11, wherein:

the cataloging one or more fraud patterns for the corresponding one or more aggregations is in accordance with an isolation forest regime.

19. The computing system of claim 11, wherein:

the information with respect to an indicated fraud attack comprises one or more of (p) for any disapproved transaction, an indication of an occurrence of the indicated fraud attack, (q) a change in rules employed by the machine learning model to indicate a fraud attack, (r) an increase in scores corresponding to aggregations and employed by the machine learning model to indicate a fraud attack, (s) rescoring for the transaction characteristics comprising transaction data and determined fraud probability, (t) a request to resubmit the transaction characteristics comprising transaction data, or (u) any combination thereof.

20. The computing system of claim 11, wherein the process further comprises:

in response to an indication of a fraud attack, adjusting, based on a respective one or more of the aggregations causing the indication, the determining the outliers for the aggregations and the cataloging one or more fraud patterns for the corresponding one or more aggregations.

* * * * *